(12) United States Patent
Foster et al.

(10) Patent No.: US 11,157,162 B2
(45) Date of Patent: *Oct. 26, 2021

(54) AUTONOMOUS AGRICULTURAL SYSTEM USER INTERFACE INTERLOCK

(71) Applicants: CNH Industrial America LLC, New Holland, PA (US); Autonomous Solutions, Inc., Mendon, UT (US)

(72) Inventors: Christopher Alan Foster, Mohnton, PA (US); John Henry Posselius, Ephrata, PA (US); Bret Todd Turpin, Wellsville, UT (US); Daniel John Morwood, Petersboro, UT (US); Brandon Chamberlain Adams, Wellsville, UT (US); James Allen Bradford, Logan, UT (US); Kim Richardson Barker, Mendon, UT (US)

(73) Assignees: CNH Industrial America LLC, New Holland, PA (US); Autonomous Solutions, Inc., Mendon, UT (US)

(*) Notice: Subject to any disclaimer, the term of this patent is extended or adjusted under 35 U.S.C. 154(b) by 17 days.

This patent is subject to a terminal disclaimer.

(21) Appl. No.: 16/743,842

(22) Filed: Jan. 15, 2020

(65) Prior Publication Data

US 2020/0201502 A1 Jun. 25, 2020

Related U.S. Application Data

(62) Division of application No. 15/179,703, filed on Jun. 10, 2016, now Pat. No. 10,572,141.

(51) Int. Cl.
*G06F 3/0488* (2013.01)
*G05D 1/00* (2006.01)
(Continued)

(52) U.S. Cl.
CPC .......... *G06F 3/0488* (2013.01); *A01B 69/008* (2013.01); *G05D 1/0011* (2013.01);
(Continued)

(58) Field of Classification Search
None
See application file for complete search history.

(56) References Cited

U.S. PATENT DOCUMENTS 6,112,139 A 8/2000 Schubert et al.
6,131,062 A 10/2000 Nielsen
(Continued)

FOREIGN PATENT DOCUMENTS

EP 1004230 A2 5/2000
EP 2846209 B1 3/2015

OTHER PUBLICATIONS

International Search Report and Written Opinion for PCT/US2017/036837 dated Oct. 11, 2017; 14 pages.

*Primary Examiner* — Kelly D Williams
(74) *Attorney, Agent, or Firm* — Rebecca L. Henkel; Rickard K. DeMille (57) ABSTRACT

A control system for an autonomous agricultural system includes a display configured to display at least one control function associated with at least one operation. The display is configured to output a first signal indicative of a first input. The control system includes a controller comprising a processor and a memory. The controller is communicatively coupled to the display and configured to receive the first signal indicative of the first input and to send a second signal to the display indicative of instructions to display a second control in an unlocked state. The display is configured to output a third signal to the controller indicative of the second input. The controller is configured to receive the third signal and to output a fourth signal indicative of instructions to control the at least one operation of the autonomous agricultural system.

18 Claims, 6 Drawing Sheets

(51) Int. Cl.
  *A01B 69/04* (2006.01)
  *G05D 1/02* (2020.01)
  *G06F 3/0484* (2013.01)

(52) U.S. Cl.
  CPC ......... *G05D 1/0016* (2013.01); *G05D 1/0278* (2013.01); *G06F 3/04847* (2013.01); *G05D 2201/0201* (2013.01)

(56) References Cited

U.S. PATENT DOCUMENTS

| | | |
|---|---|---|
| 6,356,819 B1 | 3/2002 | Winslow |
| 6,990,399 B2 | 1/2006 | Hrazdera et al. |
| 9,086,699 B2 | 7/2015 | Pirotais |
| 9,135,813 B2 | 9/2015 | Stratton et al. |
| 9,213,331 B2 | 12/2015 | Johnson et al. |
| 10,096,216 B1 | 10/2018 | McClintock |
| 2007/0150842 A1 | 6/2007 | Chaudhri et al. |
| 2009/0125850 A1 | 5/2009 | Karstens |
| 2009/0321154 A1 | 12/2009 | Johnson |
| 2012/0215394 A1 | 8/2012 | Wang et al. |
| 2013/0298024 A1 | 11/2013 | Rhee et al. |
| 2014/0324272 A1* | 10/2014 | Madsen ............... G05D 1/0246 701/28 |
| 2015/0068012 A1 | 3/2015 | McClister et al. |
| 2015/0174766 A1 | 6/2015 | Jägenstedt et al. |
| 2015/0319913 A1 | 11/2015 | Foster et al. |
| 2015/0366124 A1 | 12/2015 | Kremmer et al. |
| 2017/0017392 A1 | 1/2017 | Castaneda et al. |
| 2017/0300219 A1 | 10/2017 | Buchner et al. |

* cited by examiner

AUTONOMOUS AGRICULTURAL SYSTEM USER INTERFACE INTERLOCK

CROSS-REFERENCE TO RELATED APPLICATION

This application is a divisional of U.S. patent application Ser. No. 15/179,703, entitled "AUTONOMOUS AGRICULTURAL SYSTEM USER INTERFACE INTERLOCK," filed Jun. 10, 2016, which is hereby incorporated by reference in its entirety for all purposes.

BACKGROUND

The subject matter of the disclosure relates generally to agricultural systems, and more specifically, to a user interface interlock for an autonomous agricultural system.

Vehicles, such as agricultural tractors, may be driven through a field of crops to perform various agricultural operations. In recent years, vehicles have been designed to operate at least partially without input from an onboard operator. For example, the vehicle may perform one or more operations by receiving one or more instructions remotely, thereby enabling the vehicle to operate in an autonomous or semi-autonomous manner (e.g., at least partially without input from an operator present within the vehicle). For example, a remote operator or an operator with the vehicle may activate the vehicle and initiate operations. Unfortunately, in certain systems, an operator may unintentionally initiate certain operations by inadvertently interacting with elements of the user interface, such as an interface on a touchscreen.

BRIEF DESCRIPTION

A summary of certain embodiments disclosed herein is set forth below. It should be understood that these aspects are presented merely to provide the reader with a brief summary of these embodiments and that these aspects are not intended to limit the scope of this disclosure. Indeed, this disclosure may encompass a variety of aspects that may not be set forth below.

In a first embodiment, a control system for an autonomous agricultural system includes a touchscreen display configured to display at least one control function associated with at least one operation of the autonomous agricultural system, wherein the touchscreen display is configured to receive a first input indicative of actuation of a first control and to output a first signal indicative of the first input, and a controller including a processor and a memory, wherein the controller is communicatively coupled to the touchscreen display and configured to send a second signal to the touchscreen display indicative of instructions to display a second control of the at least one control function in an unlocked state upon receipt of the first signal, wherein the touchscreen display is configured to receive a second input indicative of actuation of the second control while the second control is in the unlocked state and to output a third signal to the controller indicative of the second input, and the controller is configured to receive the third signal and to output a fourth signal indicative of instructions to control the at least one operation of the autonomous agricultural system based on the second input.

In a second embodiment, a control system for an autonomous agricultural system includes a touchscreen display configured to display at least one control function associated with at least one operation of the autonomous agricultural system, wherein the touchscreen display is configured to receive a first input indicative of a multipoint depression, a depression of a threshold pressure, a gesture, a depression of a threshold duration, or any combination thereof, and to output a first signal indicative of the first input; and a controller including a processor and a memory, wherein the controller is communicatively coupled to the touchscreen display and configured to receive the first signal and to send a second signal to control at least one operation of the autonomous agricultural system upon receipt of at least the first signal.

In a third embodiment, a controller for an autonomous agricultural system, wherein the controller includes a memory operatively coupled to a processor, wherein the controller is configured to receive a first signal indicative of a first input from a touchscreen display associated with unlocking a manual control of the autonomous agricultural system, to send a second signal to the touchscreen display indicative of instructions to display the manual control in an unlocked state, to receive a third signal indicative of a second input from the manual control, and to output a fourth signal to control the autonomous agricultural system based on the second input.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
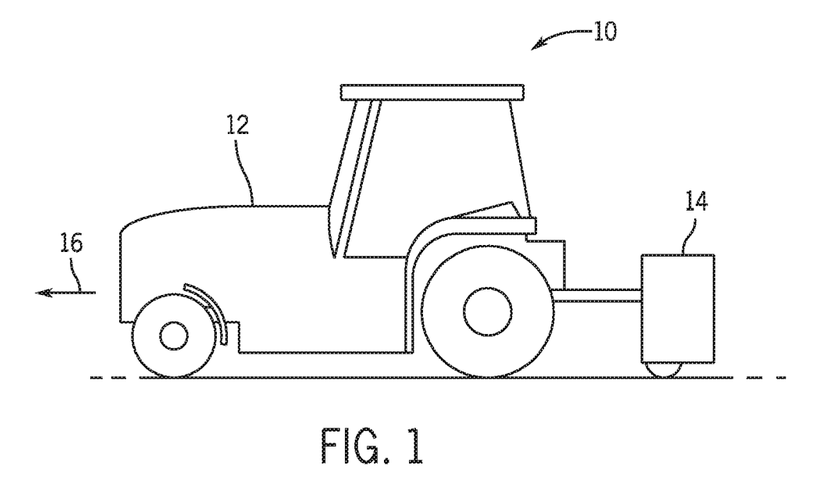
FIG. 1 is a side view of an embodiment of an agricultural system that includes an agricultural vehicle and an agricultural implement.

Turning to the figures, FIG. 1 is a side view of an embodiment of an agricultural system 10 that includes an agricultural vehicle 12, such as a tractor or another prime mover, and an agricultural implement 14. The agricultural vehicle 12 is configured to tow the agricultural implement 14 along a direction of travel 16 through an agricultural field to perform various agricultural operations. For example, the agricultural implement 14 may include a tillage tool, a fertilizer application tool, a seeding or planting tool, a harvesting tool, or a combination thereof, among other agricultural tools. While the agricultural implement 14 is towed by the agricultural vehicle 12 (e.g., in front of or behind the agricultural vehicle 12), it should be appreciated that in alternative embodiments, the agricultural implement may be incorporated into the agricultural vehicle.

In the illustrated embodiment, the agricultural vehicle 12 is configured to operate autonomously (e.g., without input from an operator, without an operator present in the cab of the agricultural vehicle, etc.). Accordingly, an automatic system may direct the agricultural vehicle 12 and the agricultural implement 14 without direct control from an operator within the cab. For example, an operator may input instructions to a control system (e.g., from within the cab, from a location remote from the agricultural vehicle 12, etc.), and/or automatic instructions may be generated at a remote base station and sent to the agricultural system 10. The control system may then direct the agricultural system to perform various agricultural operations.

Figure 2:
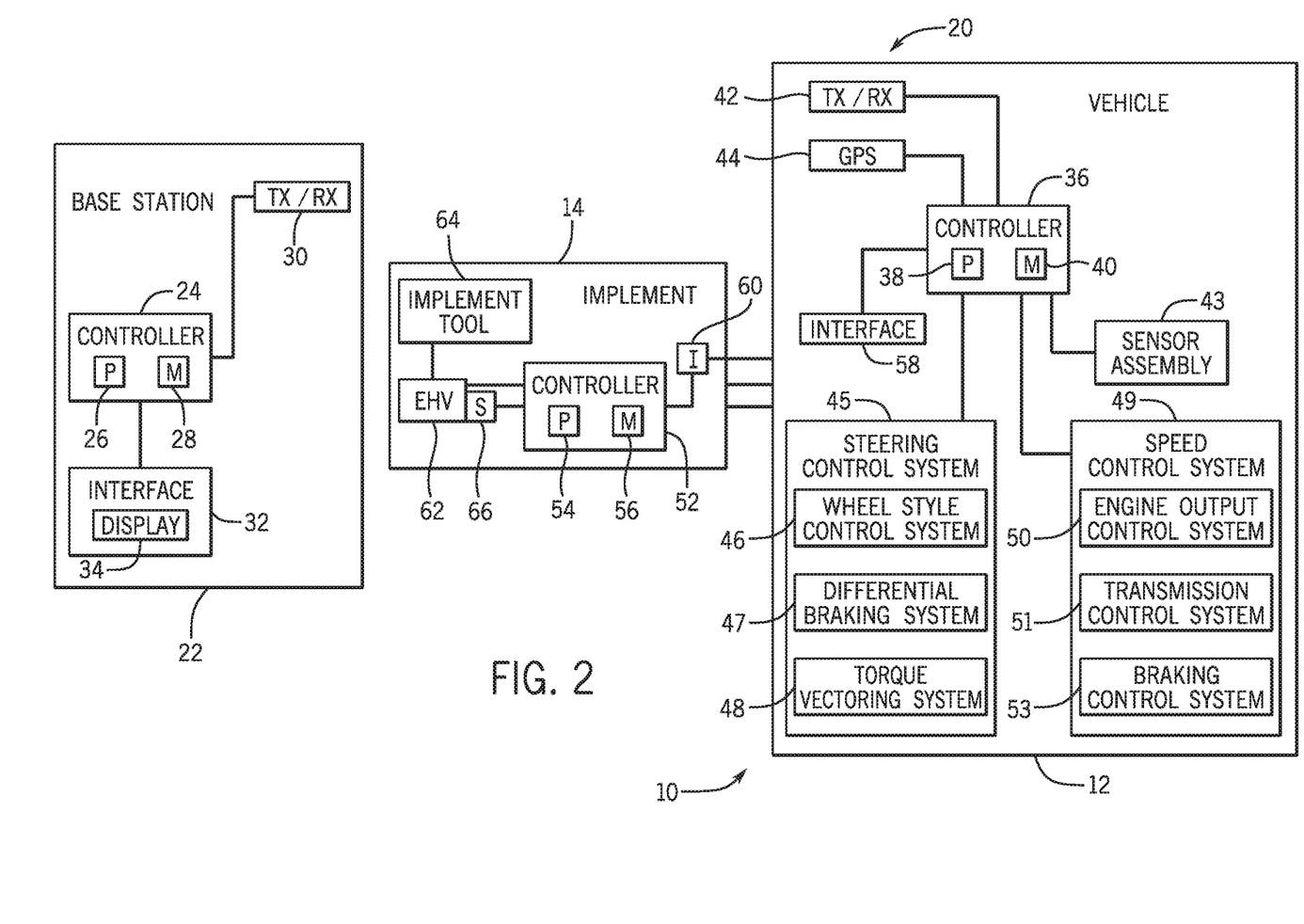
FIG. 2 is a schematic diagram of an embodiment of a control system that may be utilized to control the agricultural vehicle and the agricultural implement of FIG. 1.

FIG. 2 is a schematic diagram of an embodiment of a control system 20 that may be utilized to control the agricultural vehicle 12 and the agricultural implement 14 of FIG. 1. The control system 20 includes a base station 22 having a base station controller 24. The base station controller 24 includes a processor 26, memory 28, a transceiver 30, and a user interface 32 having a display 34. The base station controller 24 may receive input via the display 34 (e.g., via a touchscreen of the display 34) indicative of one or more operations to be performed by the agricultural system 10. In certain embodiments, the base station controller 24 may receive input via a keyboard and/or a mouse, and/or the base station controller 24 may determine operations to be performed (e.g., based on input data). Further, the base station controller 24 may generate and send signals via the transceiver 30 to a controller of the agricultural system 10 indicative of instructions to perform the agricultural operations.

In the illustrated embodiment, the control system 20 includes a controller 36 of the vehicle 12 having a processor 38 and a memory 40. The vehicle controller 36 may receive signal(s) from a transceiver 42 and/or a spatial locating device 44 (e.g., global positioning system receiver). In addition, the agricultural vehicle 12 includes a sensor assembly 43 to facilitate autonomous control of the agricultural vehicle 12. For example, the sensor assembly 43 may include multiple sensors (e.g., infrared sensors, ultrasonic sensors, magnetic sensors, etc.) that provide input to the vehicle controller 36. Further, the vehicle controller 36 is configured to receive signal(s) from the sensor assembly 43, the transceiver 42, the spatial locating device 44, or a combination thereof, and to control one or more operations of the agricultural system 10 based on the received signal(s).

The vehicle controller 36 may generate and send signal(s) to control one or more operations of the agricultural vehicle 12 and/or the agricultural implement 14. For instance, the vehicle controller 36 may send signal(s) to a steering control system 45 to control a direction of movement of the agricultural vehicle 12 and/or to a speed control system 49 to control a speed of the agricultural vehicle 12. The steering control system 45 may include a wheel angle control system 46, a differential braking system 47, and a torque vectoring system 48. The wheel angle control system 46 may automatically rotate one or more wheels and/or tracks of the agricultural vehicle 12 (e.g., via hydraulic actuators) to steer the agricultural vehicle 12 along a desired route. By way of example, the wheel angle control system 46 may rotate front wheels/tracks, rear wheels/tracks, and/or intermediate wheels/tracks of the agricultural vehicle, either individually or in groups. The differential braking system 47 may independently vary the braking force on each lateral side of the agricultural vehicle 12 to direct the agricultural vehicle 12 along the desired route. Similarly, the torque vectoring system 48 may differentially apply torque from an engine to wheels and/or tracks on each lateral side of the agricultural vehicle 12, thereby directing the agricultural vehicle 12 along a desired route. While the illustrated steering control system 45 includes the wheel angle control system 46, the differential braking system 47, and the torque vectoring system 48, it should be appreciated that alternative embodiments may include one or two of these systems, in any suitable combination. Further embodiments may include an automated steering control system having other and/or additional systems to facilitate directing the agricultural vehicle along the desired route.

In the illustrated embodiment, the automated speed control system 49 includes an engine output control system 50, a transmission control system 51, and a braking control system 53. The engine output control system 50 is configured to vary the output of the engine to control the speed of the agricultural vehicle 12. For example, the engine output control system 50 may vary a throttle setting of the engine, a fuel/air mixture of the engine, a timing of the engine, other suitable engine parameters to control engine output, or a combination thereof. In addition, the transmission control system 51 may adjust gear selection within a transmission to control the speed of the agricultural vehicle 12. Furthermore, the braking control system 53 may adjust braking force, thereby controlling the speed of the agricultural vehicle 12. While the illustrated automated speed control system 49 includes the engine output control system 50, the transmission control system 51, and the braking control system 53, it should be appreciated that alternative embodiments may include one or two of these systems, in any suitable combination. Further embodiments may include an automated speed control system having other and/or additional systems to facilitate adjusting the speed of the agricultural vehicle.

The vehicle controller 36 may send signal(s) to the implement controller 52 to control operation of the agricultural implement 14 (e.g., to raise/lower tool(s) on the implement 14, to fold/unfold wing(s) of the implement, etc.). For example, the controller 36 may send signal(s), via an interface 58, to control hydraulic systems, pneumatic systems, electrical systems, or a combination thereof, of the agricultural implement 14. In embodiments in which the implement 14 includes a tillage tool, the processor 38 may send signal(s) via the interface 58 indicative of instructions to raise the implement to a transport position. Further, the controller 36 may send signal(s) indicative of instructions to lower the implement before performing a tilling operation. The implement controller 52 may be coupled to the implement 14 and include a processor 54 and a memory 56, similar to the processors 26 and 38 and the memories 28 and 40, as described with respect to the base station 22 and the agricultural vehicle 12. The implement controller 52 may receive signal(s) via an interface 60 and control operation of the agricultural implement 14 based on the received signal(s). In other embodiments, the controller 38 may send signal(s) via the interface 58 to control the agricultural implement 14 directly (e.g., without the implement controller 52). The interface 58 may be communicatively coupled to the interface 60 of the implement to enable communication between the controller 52 of the implement 14 and the controller 36 of the agricultural vehicle 12 while the implement is engaged with the agricultural vehicle 12. Further, the controller 36 may communicate (e.g., wirelessly or wired) via a communication protocol (e.g., local interconnect network (LIN) communication, WiFi communication, Ethernet communication, Controller Area Network (CAN) communication, international organization for standardization 11783 (ISO bus) communication, etc.) with various systems, such as the implement.

In the illustrated embodiment, the controllers 24, 36, and 52 each include a processor, such as the microprocessor 26, 38, and 54, and a memory, such as the memory devices 28, 40, and 56, respectively. The controllers 24, 36, and 52 may also include one or more storage devices and/or other suitable components. The processors 26, 38, and 54 may be used to execute software, such as software for controlling the agricultural system, and so forth. Moreover, the processors 26, 38, and 54 may include one or more "general-purpose" microprocessors, one or more special-purpose microprocessors, one or more application specific integrated circuits (ASICS), or some combination thereof. For example, each processor 26, 38, and 54 may include one or more reduced instruction set (RISC) processors.

The memory devices 28, 40, and 56 may include a volatile memory, such as random access memory (RAM), and/or a nonvolatile memory, such as read-only memory (ROM). The memory device 28, 40, and 56 may store a variety of information and may be used for various purposes. For example, the memory devices 28, 40, and 56 may store processor-executable instructions (e.g., firmware or software) for the processors 26, 38, and 54 to execute, such as instructions for controlling the agricultural vehicle 12. The storage device(s) (e.g., nonvolatile storage) may include ROM, flash memory, hard drive(s), or any other suitable optical, magnetic, or solid-state storage medium, or a combination thereof. The storage device(s) may store data (e.g., associated with control of the agricultural system 10), instructions (e.g., software or firmware for receiving inputs from an operator and controlling operation of the agricultural system 10 based on the received inputs), any other suitable data, or a combination thereof.

The spatial locating device 44 (e.g., mounted to the agricultural vehicle 12) is communicatively coupled to the vehicle controller 36. The spatial locating device 44 may be configured to determine a position of the agricultural vehicle 12 and/or the implement 14. The spatial locating device 44 may include any suitable system configured to determine the position of the agricultural vehicle 12 and/or the implement 14, such as a global positioning system (GPS) receiver, for example. In certain embodiments, the spatial locating device 44 may be configured to determine the position of the agricultural vehicle 12 and/or the agricultural implement 14 relative to a fixed global coordinate system (e.g., via the GPS receiver) or a fixed local coordinate system. Further, in some embodiments, the spatial location of the agricultural vehicle 12 and/or the agricultural implement 14 may be determined. For example, the agricultural implement location may be determined based on the geometry of the agricultural implement 14 and/or the geometry of the agricultural vehicle 12, and the determined location of the agricultural vehicle 12. In certain embodiments, the transceiver 42 may broadcast signal(s) indicative of the position of the agricultural vehicle 12 and/or the implement 14 to the transceiver 30 of the base station 22 or any other suitable transceiver.

In the illustrated embodiment, the agricultural implement 14 includes an electro-hydraulic valve (EHV) 62, such as an electro hydraulic remote (EHR), configured to control operation of an implement tool 64. For example, the implement tool 64 may include a tillage tool, a fertilizer application tool, a seeding or planting tool, a harvesting tool, or a combination thereof, among other agricultural tools. For instance, a tillage tool may be raised, lowered, or controlled to any suitable point there between via signals sent to the EHV 62. Further, a sensor 66 may be configured to detect a position of the EHV 62. The controller 36 may receive signal(s) from the sensor 66 (e.g., via the implement controller 52) indicative of a position of the EHV 62.

Figure 3:
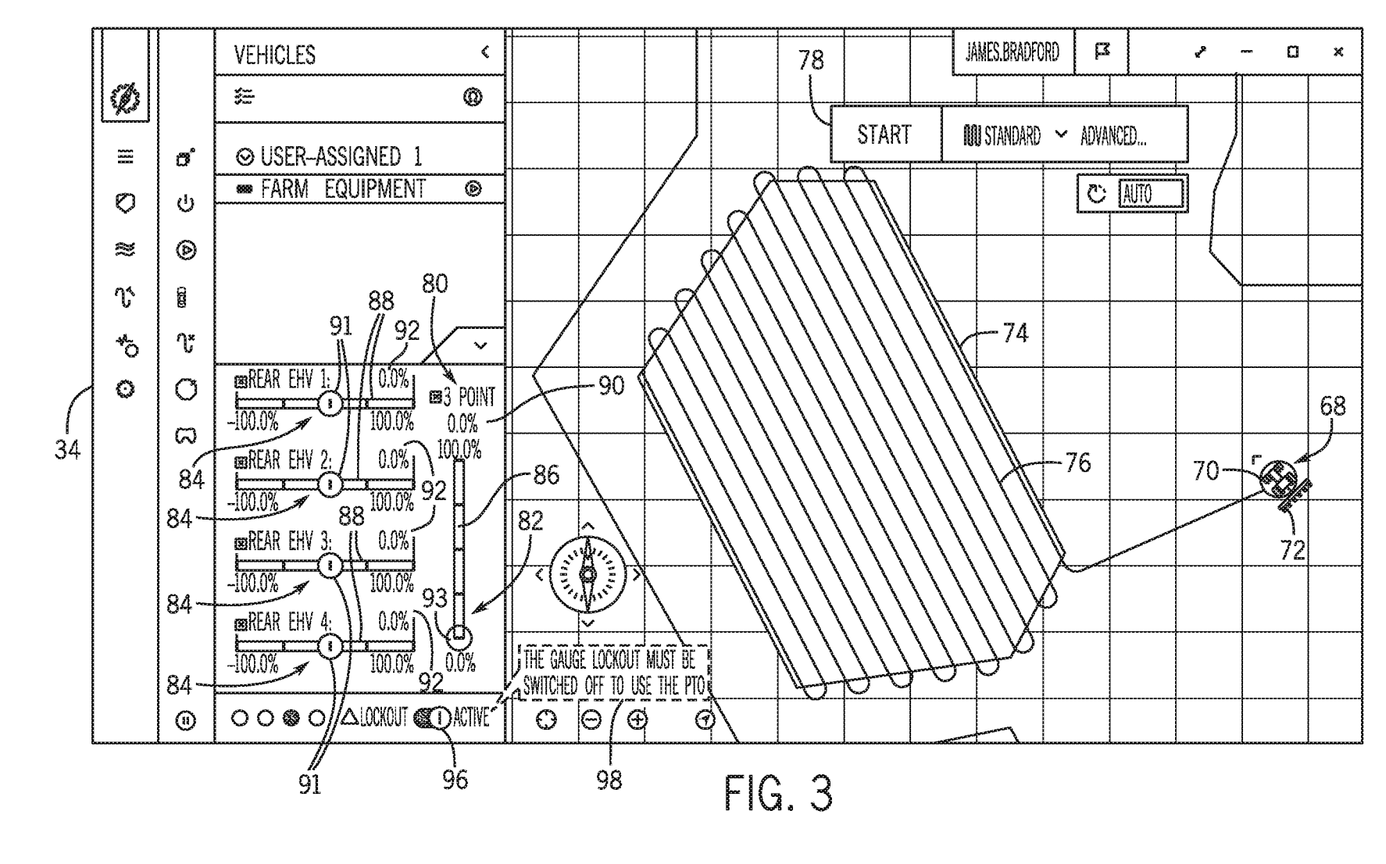
FIG. 3 is a diagram of an embodiment of a display of the control system of FIG. 2.

FIG. 3 is a diagram of an embodiment of a touchscreen display 34 that may be utilized to control the agricultural system 10. The base station controller may receive signal(s) indicative of the position of the agricultural vehicle 12 from the spatial locating device via the transceivers. Based on the position of the agricultural system, the controller sends signal(s) to the display 34 indicative of instructions to show one or more virtual agricultural systems 68 that include a virtual agricultural vehicle 70 and virtual agricultural implement 72 at a position corresponding to the position of the agricultural vehicle 12 and/or the agricultural implement 14. The controller may receive a first input from an operator selecting the virtual agricultural vehicle 70 and/or the agricultural implement 72 (e.g., by depressing the virtual agricultural vehicle 70 and/or the virtual agricultural implement 72). The controller may then receive a second input from the operator selecting a virtual agricultural field 74 (e.g., by depressing the virtual agricultural field 74) that represents an agricultural field in which the agricultural system may perform an agricultural operation. The controller may then plan a path 76 for the agricultural vehicle and/or the agricultural implement to move toward the agricultural field and/or to traverse the agricultural field. For example, the controller may receive signal(s) indicative of a selection of an agricultural field and determine the path 76 throughout the agricultural field.

The controller may then receive a third input from the operator indicative of instructions to commence an autonomous agricultural operation on the agricultural field. For example, the controller may send signal(s) for the touchscreen display 34 indicative of instructions to display a start button 78 while the virtual agricultural vehicle 70 and/or implement 72 and the virtual agricultural field 74 are selected. The controller may receive signal(s) from the display indicative of actuation of the start button 78 and may commence the autonomous agricultural operation accordingly (e.g., by sending signal(s) to the steering control system and/or the speed control system indicative of instructions to direct the agricultural system along the path).

In the illustrated embodiment, the touchscreen display 34 displays a control panel 80 having various control functions indicative of operating states of the agricultural system 10. While the control panel 80 is shown to the left of the virtual agricultural system 68 and the virtual agricultural field 74, it should be appreciated that in alternative embodiments, the control panel 80 may be in any suitable location on the display 34. The control panel 80 includes a three-point hitch (3PH) control function 82 configured to control and to display an operating state of a 3PH of the agricultural implement. Further, the control panel 80 includes four electro-hydraulic valve (EHV) control functions 84 each configured to control and to display an operating state of an EHV of the agricultural implement 14. While four EHV control functions 84 are shown in FIG. 3, one, two, three, four, five, or any other suitable number of EHV control functions may be displayed to enable the operator to control corresponding EHVs.

In the illustrated embodiment, each of the 3PH control function 82 and the EHV control functions 84 present a graphical representation of the position of the EHV or the 3PH via a respective virtual slide bar 86 or 88. Each of the control functions 82 and 84 includes a numerical representation 90 or 92 of the value of the respective parameter. To adjust the value of each parameter, a respective slider 91 or 93 may be moved along a path of the slide bars 86 or 88. As the slider moves, the numerical representation 90 or 92 (e.g., representation of percentage of movement of the 3PH or the EHV of the agricultural implement) of the respective parameter changes based on the position of the slider 91 or 93 along the slide bar 86 or 88. While each control function includes a slide bar 86 and 88 in the illustrated embodiment, it should be appreciated that in alternative embodiments, other suitable control functions and/or representations of the parameter values may be displayed. In certain embodiments, the graphical representation may be displayed without the numerical representation, or the numerical representation may be displayed without the graphical representation. Further, while the control panel 80 is described with respect to 3PH and EHV operations, the touchscreen display 34 may include other controls and/or gauges that control and/or display values indicative of operation of other systems/features of the agricultural vehicle and/or the agricultural implement, such as wheel angle from the wheel angle control system, vehicle speed from the speed control system, power takeoff (PTO) operation, or any other suitable system/feature of the agricultural system 10.

In certain embodiments, the base station controller sends signal(s) via the transceiver to the agricultural vehicle controller indicative of instructions to control the 3PH and/or the EHV based on the selected inputs on the touchscreen display 34. The agricultural vehicle controller receives the signal(s) indicative of the instructions via the transceiver and controls the 3PH and/or EHV (e.g., via the implement controller) based on the received instructions. During the agricultural operation (e.g., after the start button 78 is activated), the vehicle controller may receive signal(s) indicative of value(s) of one or more operating parameters of the agricultural vehicle and/or the agricultural implement. For example, the vehicle controller may receive signal(s) from the sensor(s) indicative of a position of the EHV. The vehicle controller may then send signal(s) to the touchscreen display 34 indicative of instructions to display the EHV slider 91 in a position that corresponds to the position of the EHV.

Moreover, the control panel 80 may enable a remote operator at the base station to manually control (e.g., manually override) operation of the agricultural system 10 (e.g., during autonomous agricultural operation). For example, the base station controller may receive an input (e.g., actuation of the virtual control) from the touchscreen display 34 indicative of instructions to control one or more operating parameters of the agricultural system. In the illustrated embodiment, the base station controller receives the input indicative of a selection of a position of the EHV via the control function 84. The base station controller then determines the position of the EHV that corresponds to the position selected from the EHV slider 91 and sends signal(s) indicative of the desired position of the EHV to the vehicle controller. The vehicle controller then sends signal(s) to the EHV (e.g., via the implement controller) to control a function of the implement based on the position of the EHV, thereby enabling a remote operator to manually control the function of the implement via interaction with the touchscreen display 34.

To substantially reduce or eliminate the possibility of unintentional activation of certain controls on the touchscreen display 34, the display 34 includes an interlock control 96 that disables operation of manual controls while the interlock control 96 is active. For example, with the interlock control 96 active, unintentional contact with the control panel 80 may not cause unintentional movement of the agricultural vehicle 12 or unintentional control of the EHV and/or the 3PH. The display 34 is configured to receive a first input indicative of a command (e.g., depression of the touchscreen 34) to deactivate (e.g., unlock) the first control (e.g., interlock control 96). For instance, an operator may deactivate the interlock control 96 via a swipe gesture from a first location to a second location at the interlock control 96. The touchscreen display 34 may send a first signal indicative of the swipe input to the base station controller. In response, the base station controller may receive the first signal and send a second signal to the touchscreen display indicative of instructions to deactivate (e.g., unlock) the interlock control 96 and to display one or more control functions 82 and 84 in an unlocked state. The touchscreen display 34 is configured to receive a second input indicative of actuation of the second control (e.g., slider 91) while the second control is in the unlocked state. The touchscreen display 34 may output a third signal to the controller indicative of the second input. The controller may receive the third signal and output a fourth signal (e.g., to the implement controller, to the EHV, to the 3PH, etc.) to control the one or more operations of the autonomous agricultural system based on the second input. While a swipe gesture at an interlock control is provided as an example to unlock the interlock, other inputs may be used to control the interlock, such as a multipoint depression, a depression of a threshold pressure, a gesture, a depression of a threshold duration, or any combination thereof.

Further, if an operator attempts to control the EHV or the 3PH while the interlock control 96 is active, the base station controller may instruct the display 34 to present a notification 98 on the touchscreen display 34 indicating that the interlock 96 is active/locked, thereby informing the operator to deactivate the interlock 96 to enable manual operation of the 3PH control function 82 and/or the EHV control functions 84. Additionally and/or alternatively, the base station controller may send signal(s) to the display 34 indicative of instructions to control a visual state of the 3PH control function 82 and/or the EHV control functions 84 based on whether the 3PH control function 82 and/or the EHV control functions 84 are activated or deactivated. For example, the base station controller may send signal(s) to change a color and/or font of the 3PH control function 82 and/or the EHV control functions 84 and/or the surrounding text (e.g., numerical representation 90 and 92) based on the state of the interlock control 96 (e.g., a first color while active and a second color while not active).

In the illustrated embodiment, the controller commences one or more operations of the autonomous agricultural system upon receipt of a first signal indicative of an input on a display. For example, the touchscreen display 34 may be configured to receive an input indicative of a multipoint depression, depression of a threshold pressure, a gesture, a depression of a threshold duration, or any combination thereof. The touchscreen display 34 may then output a first signal indicative of the first input. The base station controller may receive the first signal and send a second signal to commence one or more operations of the autonomous agricultural system upon receipt of the first signal indicative of the input from the touchscreen display. For example, the display may receive an input indicative of depression of the start button 78 for a threshold duration. The display may provide a first signal to the base station controller indicative of the input. The base station controller may compare the duration of the depression with a threshold duration. The base station controller may send a signal to commence the operation based on whether the duration of the depression exceeds the threshold duration.

Figure 4:
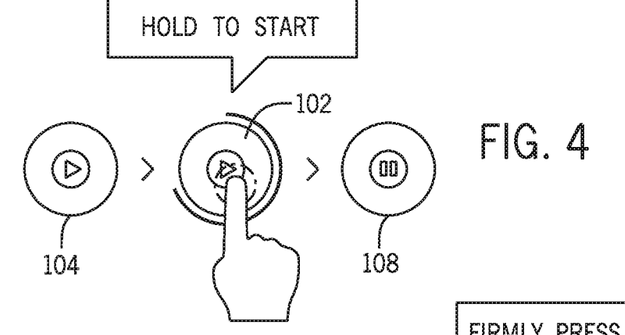
FIG. 4 is a diagram of an embodiment of an interlock that may be displayed on the display of FIG. 3.

FIG. 4 is a diagram of an embodiment of an interlock 102 that may be displayed on the touchscreen display. In the illustrated embodiment, the interlock 102 activates or deactivates automatic control of the agricultural vehicle. The base station controller may receive signals from the display indicative of selection of a virtual agricultural vehicle corresponding to the agricultural vehicle. Then, the base station controller may receive signal(s) from the display 34 indicative of selection of a location on the agricultural field. The base station controller may then send signal(s) to the display 34 to enable a start button 104 that starts the engine or initiates vehicle motion upon activation of the start button 34. To substantially reduce or eliminate the possibility of unintentional activation of the start button, the base station controller may receive an input depressing the interlock 102 for a duration of time (e.g., select and hold). For example, to unlock the interlock 102, the display may receive an input indicative of a depression to unlock the interlock 102 at the 3PH control function 82 and/or at the EHV control functions 84. As another example, the display may receive an input indicative of a depression to unlock the interlock 102 at the control panel interlock (e.g., to enable the control panel). Once the duration of the depression to unlock the interlock 102 has reached a threshold duration, the base station controller commence starting of the engine or initiating vehicle motion to the designated location. During vehicle motion, the base station controller may send signals to the display 34 to display a pause button 108 that pauses the movement of agricultural vehicle 12.

Figure 5:
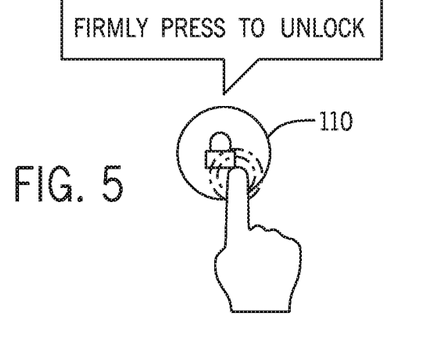
FIG. 5 is a diagram of another embodiment of an interlock that may be displayed on the display of FIG. 3.

FIG. 5 is a diagram of another embodiment of an interlock 110 that may be displayed on the touchscreen display. In the illustrated embodiment, the interlock 110 activates or deactivates the control panel to enable or disable manual control of operation(s) of the agricultural implement, for example. The display is configured to receive a pressure sensitive input indicative of an amount of pressure from depression of the interlock on the display. The display may send a signal to the base station controller indicative of the amount of pressure from the depression. The base station controller may compare the amount of pressure to a pressure threshold. When the input pressure exceeds the pressure threshold, the base station controller may deactivate the interlock 110 to enable manual control via the control panel 80, thereby enabling the operator to control operation(s) of the implement. Alternatively and/or additionally, the base station controller may compare the pressure input to a pressure threshold and send signal(s) to the autonomous agricultural system to commence the one or more agricultural operations based upon the comparison. For example, the display may receive a pressure input at the start button indicative of a pressure and output a signal indicative of the pressure input. Upon receiving the pressure input, the base station controller may compare the pressure input to a pressure threshold and send signal(s) to the autonomous agricultural system to commence the one or more agricultural operations. As another example, the display may receive a pressure input at the 3PH control function 82 and/or the EHR control functions 84 indicative of a pressure and output a signal indicative of the pressure input.

Figure 6:
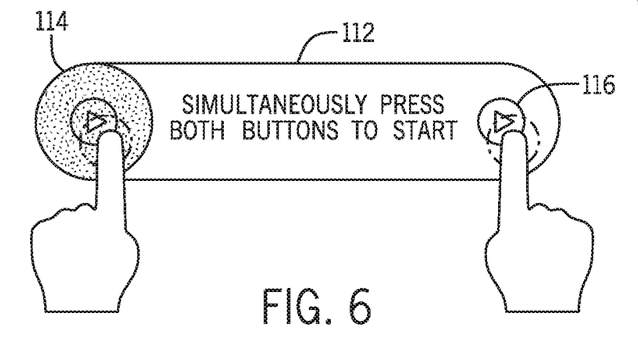
FIG. 6 is a diagram of another embodiment of an interlock that may be displayed on the display of FIG. 3.

FIG. 6 is a diagram of another embodiment of an interlock 112 that may be displayed on the touchscreen display. In the illustrated embodiment, the interlock 112 may enable or disable manual control of the agricultural implement and/or may commence an agricultural operation of the agricultural vehicle 12. The display is configured to receive a first input of actuation of a first control 114 (e.g., depression of the start button) on the display at a first location. The display may send a first signal to the base station controller indicative of the first input, and the base station controller may send a second signal to the display indicative of instructions to display a second control 116 (e.g., a second button associated with the start button) on the display at a second location, different from the first location. The display may then receive a second input (e.g., indicative of simultaneous depression of the first control 114 and the second control 116, depression of the second control alone, etc.). The display may send a third signal indicative of the second input to the base station controller. The base station controller may output a fourth signal to the agricultural vehicle controller and/or the implement controller indicative of instructions to commence the one or more agricultural operations. For example, upon receiving the first and third signals, the base station controller may begin movement of the agricultural vehicle to a selected location. Alternatively and/or additionally, the base station controller may send a fifth signal to the touchscreen display indicative of instructions to display one or more controls (e.g., the 3PH control function 82 and/or the EHR control functions 84) in an unlocked state. The touchscreen display may receive a third input indicative of actuation of a control on the control panel to control the autonomous agricultural system (e.g., 3PH and/or EHR of the implement). While two controls 114 and 116 are shown at two locations, the base station controller may instruct the display to present three or more buttons, and the controller may receive inputs that correspond to three or more depressions to facilitate reducing unintentional activation of the autonomous agricultural system. Further, the first input and/or the second input may be inputs at the 3PH control function 82 and/or the EHR control functions 84.

Figure 7:
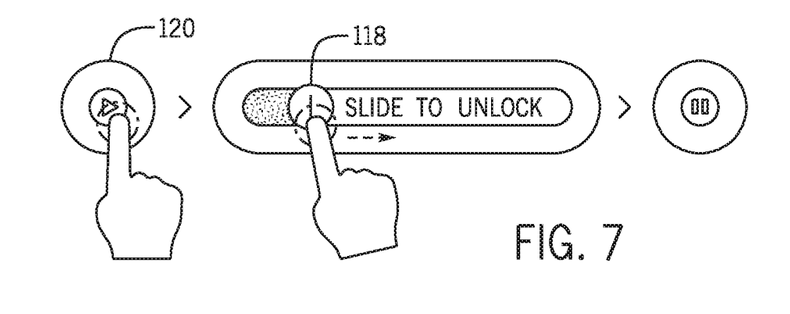
FIG. 7 is a diagram of another embodiment of an interlock that may be displayed on the display of FIG. 3.

FIG. 7 is a diagram of another embodiment of an interlock 118 that may be displayed on the touchscreen display. The interlock 118 may be an interlock located at the control function 120 (e.g., at the 3PH control function and/or the EHR control functions). In the illustrated embodiment, the interlock 112 may be located at the control function 120 (e.g., the start button) to commence an agricultural operation of the agricultural vehicle 12. For example, the touchscreen display may receive a first input indicative of actuation (e.g., depression) of a control (e.g., start button). The touchscreen display may output a first signal to the base station controller indicative of the first input. The base station controller may receive the first signal and send a second signal to the touchscreen display indicative of instructions to display the interlock 118 at or in proximity to the control 120. The display may receive a second input indicative of actuation of the control via a gesture along the display from a first location to a second location (e.g., slide to unlock), and output a third signal to the base station controller indicative of the second input. The base station controller may receive the third signal and send a fourth signal to the agricultural vehicle controller and/or the implement controller to commence the one or more agricultural operations. While the start button is used as an example above, the interlock 118 may be used to unlock a second control that controls one or more operations of the agricultural system. For example, the base station controller may receive a signal indicative of a gesture at the 3PH control function and/or the EHR control function and the controller may send signals to control the 3PH and/or the EHR of the autonomous agricultural system. Further, in certain embodiments, the base station controller may receive a signal indicative of a gesture to unlock the control panel. Additionally, while a gesture from a first location to a second location is used as an example, any variety of gestures (e.g., swipe, scroll, taps, etc.) may be used that are suitable for controlling actuation of the control functions. Further, in some embodiments, a gesture alone (e.g., not on a corresponding button) may be used to commence the one or more agricultural operations.

Figure 8:
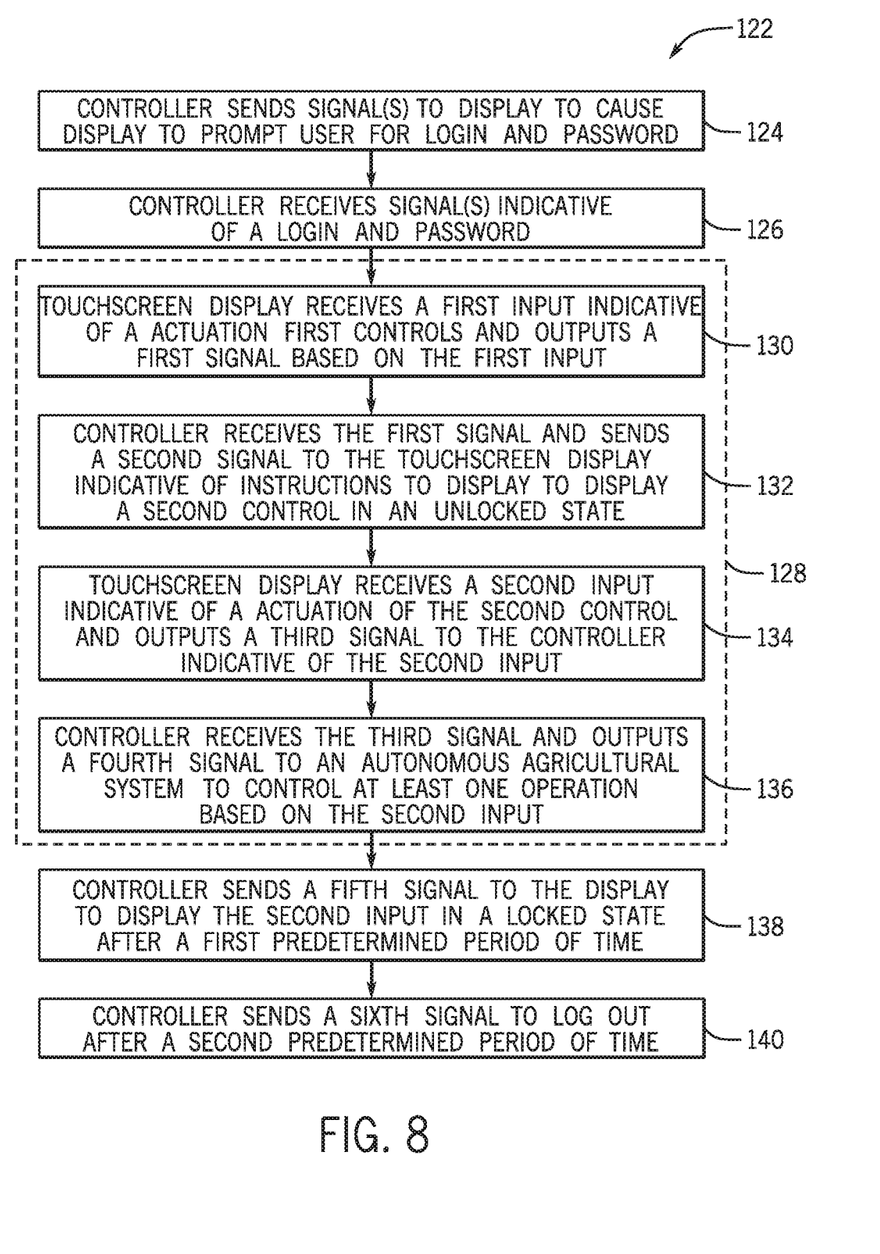
FIG. 8 is a flow diagram of an embodiment of a method that may be performed by the control system of FIG. 2.

FIG. 8 is a flow diagram of an embodiment of a method 122 for controlling the agricultural system. The method 122 may be stored as instructions (e.g., code) in memory and executed by one or more of the processors. First, as represented by block 124, the controller sends signal(s) to the display to prompt an operator for login information (e.g., user name and password). At block 126, the controller receives the login information via the touchscreen display (e.g., virtual keyboard), a keyboard, and/or mouse, and verifies the login information against permissions for controlling the agricultural system.

At block 128, the touchscreen display and the controller receive and send various inputs and/or outputs to control one or more operations of the autonomous agricultural system. Further, to substantially reduce or eliminate the possibility of unintentional activation of certain controls on the touchscreen display, at block 128, the controller disables operation of manual controls while an interlock control is active. In the illustrated embodiment, at block 130, the touchscreen display receives a first input indicative of actuation of a first control and outputs a first signal based on the first input. At block 132, the base station controller receives the first signal and sends a second signal to the touchscreen display indicative of instructions to display a second control in an unlocked state. For example, the base station controller may receive a swipe input from a first location to a second location, a pressure sensitive input that exceeds a threshold pressure, or an input having multiple touches at corresponding locations, among others. The second input may include any suitable input that controls operation of the agricultural system. For instance, the second input may include inputs that control movement of the agricultural vehicle, tools on the agricultural implement, wings of the agricultural implement, an engine of the agricultural vehicle, a direction of the agricultural vehicle, hydraulics and/or pneumatics of the agricultural implement, and the like.

At block 134, the touchscreen display receives a second input indicative of actuation (e.g., depression) of the second control and outputs a third signal to the base station controller indicative of the second input. The second input may include any suitable input that the display may receive to control operation of the agricultural system. At block 136, the base station controller receives the third signal indicative of the actuation of the second control to control an operation of the agricultural system. The base station controller then sends a fourth signal (e.g., to the implement controllers) to control one or more operations based on the second input.

At block 138, the base station controller sends a fifth signal to the display indicative of instructions to transition the second control to a locked state a period of time after the first input or the second input is received. For example, the base station controller may reactivate the interlock after 5 seconds, 10 seconds, 1 minute, 10 minutes, or other suitable time period. Further, the base station controller may enable the operator to adjust the threshold duration. In certain embodiments, the first control is the second control in a locked state. At block 140, the base station controller may send a sixth signal to the display indicative of instructions to log out after a second predetermined period of time. For example, the base station controller may send signal(s) to the display to prompt the operator for a login username and password after a second predetermined period of time.

Figure 9:
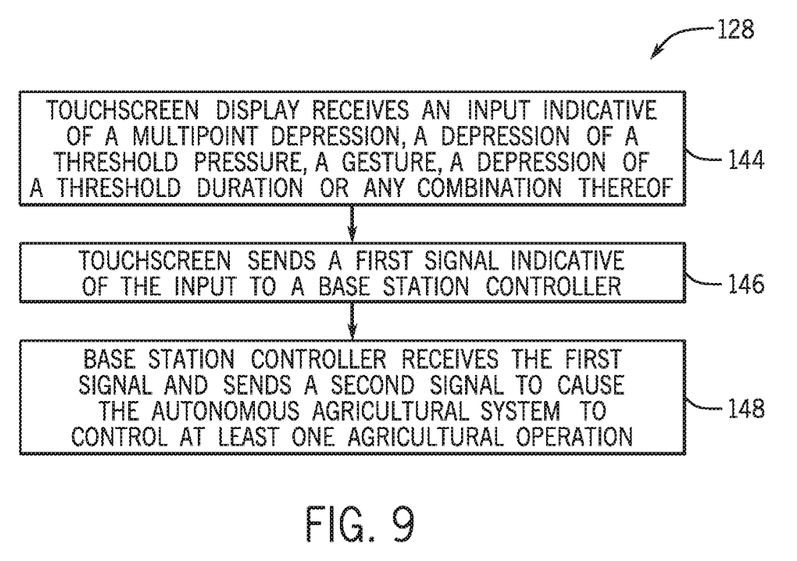
FIG. 9 is a flow diagram of another embodiment of a method that may be performed by the control system of FIG. 2.

FIG. 9 is a flow diagram of another embodiment a method for controlling the agricultural system from the base station that fits into block 128 of FIG. 8. At block 144, the touchscreen display receives an input indicative of a multipoint depression, a depression of a threshold pressure, a gesture, a depression for a threshold duration, or any combination thereof. For example, the touchscreen display may receive an input indicative of depression of the start button for a threshold duration. At block 146, the touchscreen sends a first signal indicative of the input to the base station controller. At block 148, the base station controller receives the first signal and sends a second signal to control at least one agricultural operation. For example, the base station controller may send the second signal to the controller of the agricultural vehicle indicative of instructions to commence a tillage operation, a fertilizer operation, a seeding or planting operation, a harvesting operation, or a combination thereof. While embodiments described above may include a touchscreen in a base station, in other embodiments, the touchscreen may be located in a cab of the agricultural vehicle or in any other suitable location.

While only certain features of the invention have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A control system for an agricultural system, comprising:
    a touchscreen display configured to display at least one control function associated with at least one operation of the agricultural system, wherein the touchscreen display is configured to receive a first input to the at least one control function indicative of a multipoint depression, a depression of a threshold pressure, a gesture, a depression of a threshold duration, or any combination thereof, and to output a first signal indicative of the first input; and
    a controller comprising a processor and a memory, wherein the controller is communicatively coupled to the touchscreen display and configured to receive the first signal and to output a second signal to control the at least one operation of the agricultural system in response to receipt of at least the first signal, and output a third signal to the touchscreen display indicative of instructions to display a pause control in response to receipt of at least the first signal and to pause the at least one operation in response to receiving a fourth signal indicative of actuation of the pause control.

2. The control system of claim 1, wherein the controller is configured to receive a fifth signal from the touchscreen display indicative of selection of an agricultural vehicle of the agricultural system, to receive a sixth signal from the touchscreen display indicative of selection of a location, and to output a seventh signal indicative of instructions to move the agricultural vehicle to the location.

3. The control system of claim 1, wherein the controller is configured to receive an eighth signal indicative of a selection of an agricultural field and to determine a path through the agricultural field, and the at least one operation comprises controlling the agricultural system such that the agricultural system moves along the path.

4. The control system of claim 1, wherein the controller is configured to output a ninth signal indicative of instructions to display an agricultural vehicle of the agricultural system in a location on the touchscreen display, wherein the location is based at least in part on a location signal from the agricultural vehicle.

5. The control system of claim 1, wherein the controller is configured to receive a tenth signal from the touchscreen display indicative of a second input associated with login information, to compare the login information to stored login information, and to output an eleventh signal to the touchscreen display indicative of instructions to enable access to the first input based on the comparison.

6. The control system of claim 1, wherein the controller is configured to output a twelfth signal to the touchscreen display indicative of instructions to transition the at least one control function to a locked state a period of time after the first input is received, and the at least one control function is disabled in the locked state.

7. The control system of claim 1, wherein the controller is configured to output a thirteenth signal to the touchscreen display indicative of instructions to display a change in a color, font, or both of the at least one control function, text associated with the at least one control function, or any combination thereof, in response to receiving the first signal.

8. A control system for an agricultural system, comprising:
a touchscreen display configured to display a control associated with at least one operation of the agricultural system, wherein the touchscreen display is configured to receive a first input indicative of a multipoint depression, a depression of a threshold pressure, a gesture, a depression of a threshold duration, or any combination thereof, of the control and to output a first signal indicative of the first input; and
a controller comprising a processor and a memory, wherein the controller is communicatively coupled to the touchscreen display and configured to receive the first signal and to output a second signal to the touchscreen display in response to receipt of the first signal, and the second signal is indicative of instructions to display a change in a color, font, or both of the control, text associated with the control, or any combination thereof.

9. The control system of claim 8, wherein the controller is configured to output a third signal to the touchscreen display a period of time after the first input is received, and the third signal is indicative of instructions to transition the control from an unlocked state to a locked state.

10. The control system of claim 9, wherein the controller is configured to output a fourth signal to the touchscreen display a period of time after the first input is received, wherein the fourth signal is indicative of instructions to display a login prompt, and the control is disabled during display of the login prompt until login information that matches with stored login information is entered.

11. The control system of claim 8, wherein the controller is configured to output a sixth signal to control at least one operation of the agricultural system in response to receipt of at least the first signal.

12. The control system of claim 11, wherein the controller is configured to output a seventh signal to the touchscreen display in response to receipt of at least the first signal, the seventh signal is indicative of instructions to display a pause control, and the controller is configured to pause the at least one operation in response to receiving an eighth signal indicative of actuation of the pause control.

13. The control system of claim 8, wherein the at least one operation comprises control of a three-point hitch (3PH) of an implement of the agricultural system, control of a power take off (PTO) of a vehicle of the agricultural system, control of an electrohydraulic valve (EHV) of the implement, or any combination thereof.

14. The control system of claim 8, wherein the controller is configured to:
receive a ninth signal from the touchscreen display, wherein the ninth signal is indicative of a selection of an agricultural vehicle of the agricultural system;
receive a tenth signal from the touchscreen display, wherein the tenth signal is indicative of selection of a location; and
output an eleventh signal indicative of instructions to move the agricultural vehicle to the location.

15. A controller for an agricultural system, wherein the controller comprises a memory operatively coupled to a processor, and the controller is configured to:
receive a first signal indicative of an input to a control function of a touchscreen display, wherein the input comprises a multipoint depression, a depression of a threshold pressure, a gesture, a depression of a threshold duration, or any combination thereof;
output a second signal to control at least one operation of the agricultural system in response to receipt of the first signal; and
output a third signal to the touchscreen display indicative of instructions to display a change in a color, font, or both of the control function, text associated with the control function, or any combination thereof, in response to receipt of the first signal.

16. The controller of claim 15, wherein the controller is configured to:
receive a fourth signal from the touchscreen display, wherein the fourth signal is indicative of a selection of an agricultural field;
determine a path through the agricultural field; and
control the agricultural system to move along the path.

17. The controller of claim 15, wherein the controller is configured to:
receive a location signal from an agricultural vehicle of the agricultural system; and
output a fifth signal to the touchscreen display, wherein the fifth signal is indicative of instructions to display the agricultural vehicle in a location on the touchscreen display, and the location is based at least in part on the location signal received from the agricultural vehicle.

18. The controller of claim 15, wherein the controller is configured to:
receive the first signal indicative of the input while the control function is in an unlocked state; and
output a sixth signal to the touchscreen display, wherein the sixth signal is indicative of instructions to transition the control function from the unlocked state to a locked state a period of time after the input is received.

* * * * *